(12) United States Patent
Mudgett et al.

(10) Patent No.: US 6,775,749 B1
(45) Date of Patent: Aug. 10, 2004

(54) SYSTEM AND METHOD FOR PERFORMING A SPECULATIVE CACHE FILL

(75) Inventors: Dan S. Mudgett, Austin, TX (US); Mark T. Fox, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 89 days.

(21) Appl. No.: 10/059,934

(22) Filed: Jan. 29, 2002

(51) Int. Cl.$^7$ .............................................. G06F 13/16
(52) U.S. Cl. ...................... 711/146; 711/124; 711/119; 711/204; 711/213
(58) Field of Search ................................ 711/122, 124, 711/119, 146, 204, 213

(56) References Cited

U.S. PATENT DOCUMENTS

| | | | | |
|---|---|---|---|---|
| 5,802,576 A | * | 9/1998 | Tzeng et al. ................. | 711/146 |
| 5,813,036 A | * | 9/1998 | Ghosh et al. ................ | 711/146 |
| 5,933,860 A | * | 8/1999 | Emer et al. .................. | 711/213 |
| 6,006,317 A | * | 12/1999 | Ramagopal et al. ........... | 712/23 |
| 6,073,217 A | * | 6/2000 | Mahalingaiah et al. ..... | 711/146 |
| 6,321,307 B1 | * | 11/2001 | Maguire et al. ............. | 711/146 |
| 6,457,101 B1 | | 9/2002 | Bauman et al. .............. | 711/122 |
| 6,553,463 B1 | * | 4/2003 | Arimilli et al. .............. | 711/146 |

OTHER PUBLICATIONS

"AMD Athlon Processor Data Sheet," AMD, 1999, 35 pages.

\* cited by examiner

*Primary Examiner*—B. James Peikari
(74) *Attorney, Agent, or Firm*—Robert C. Kowert; Meyertons, Hood, Kivlin, Kowert & Goetzel, P.C.

(57) ABSTRACT

A computer system may include several caches that are each coupled to receive data from a shared memory. A cache coherency mechanism may be configured to receive a cache fill request, and in response, to send a probe to determine whether any of the other caches contain a copy of the requested data. Some time after sending the probe, the cache controller may provide a speculative response to the cache fill request to the requesting device. By delaying providing the speculative response until some time after the probes are sent, it may become more likely that the responses to the probes will be received in time to validate the speculative response.

35 Claims, 6 Drawing Sheets

| Transfer Type | Requested Cache Line State | Response | Final Cache Line State | Action |
|---|---|---|---|---|
| Data | Shared/ Exclusive | Late | Dependent on probe response | Invalidate speculative response; restart when response received |
| Data | Shared/ Exclusive | Cache Miss | Exclusive | Validate speculative response |
| Data | Shared/ Exclusive | Cache Hit - Clean | Shared | Invalidate speculative response; restart in correct state immediately |
| Data | Shared/ Exclusive | Cache Hit - Dirty | Shared | Invalidate speculative response; start data movement, restart non-speculatively when data movement completes |
| Data | Modified | Late | Modified | Invalidate speculative response; restart when response received |
| Data | Modified | Cache Miss | Modified | Validate speculative response |
| Data | Modified | Cache Hit - Clean | Modified | Validate speculative response |
| Data | Modified | Cache Hit - Dirty | Modified | Invalidate speculative response; start data movement, restart non-speculatively when data movement completes |
| Instruction | Shared | Late | Shared | Invalidate speculative response; restart when response received |
| Instruction | Shared | Cache Miss | Shared | Validate speculative response |
| Instruction | Shared | Cache Hit - Clean | Shared | Validate speculative response |
| Instruction | Shared | Cache Hit - Dirty | Shared | Invalidate speculative response; start data movement, restart non-speculatively when data movement completes |

*FIG. 3*

SYSTEM AND METHOD FOR PERFORMING A SPECULATIVE CACHE FILL

BACKGROUND OF THE INVENTION

1. Field of the Invention

This invention is related to the field of computer systems and, more particularly, to performing a speculative cache fill in a computer system.

2. Description of the Related Art

Since main system memory is typically designed for density rather than speed, microprocessor designers have added caches to their designs to reduce the microprocessor's need to directly access main memory. A cache is a small memory that is more quickly accessible than the main memory. A processor may have a number of different levels of caches. For example, a processor may have a "level one" (L1) cache and a "level two" (L2) cache. These caches tend to be integrated on the same substrate as the microprocessor. Caches are typically constructed of fast memory cells such as static random access memories (SRAMs) which have faster access times and bandwidth than the memories used for the main system memory (typically dynamic random access memories (DRAMs) or synchronous dynamic random access memories (SDRAMs)). The faster SRAMs are not typically used for main system memory because of their low density and high cost.

Many other types of caches may also be present in computer systems. For example, the main system memory may act as a cache for the system's slower direct access storage devices (e.g., hard disk drives). Other devices, such as hard drives, may also include internal caches. For example, hard drives may cache recently accessed or written data in order to improve their read performance. Generally, having a cache allows a device to retrieve data from the cache more quickly than if the device had to access a larger, slower memory to retrieve the data.

When a microprocessor needs data from memory, it typically first checks its L1 cache to see if the required data has been cached. If the data is not present in the L1 cache, the L2 cache is checked (if the processor has an L2 cache). If the L2 cache is storing the data, it provides the data to the microprocessor (typically at much higher rate than the main system memory is capable of). If the data is not cached in the L1 or L2 caches (referred to as a "cache miss"), the data is read from main system memory or some type of mass storage device (e.g., a hard disk drive). Relative to accessing the data from the L1 cache, accesses to memory take many more clock cycles. Similarly, if the data is not in the main system memory, accessing the data from a mass storage device takes even more cycles.

One problem that arises due to caching is that, depending on the way in which updated data in the cache is presented to the memory, a copy of a particular line of data in a cache may not be the same as the copy of that line that is currently in system memory. For example, many caches use a write-back policy to update the copy of data in system memory. Write-back systems increase write efficiency because an updated copy of the cache line is not written back to system memory until the line is evicted from the cache. However, from the time the line is updated in the cache until the time the line is written back to system memory, the cache copy may differ from the memory copy (i.e., the memory has a "stale" copy of that data). As a result, accesses to system memory may be controlled so that other devices in the computer system do not access the stale copy of the data in the system memory. Generally, this problem is one of cache coherence, or ensuring that each device in the computer system accesses the correct (i.e., most recently updated) copy of a particular item of data, regardless of which device is requesting the data or where the data is actually stored. In single processor systems, maintaining cache coherency usually involves restricting I/O devices' access to system memory and/or restricting which portions of system memory may be cached.

In multiprocessor systems, maintaining cache coherency may be a significant problem because the different processors may frequently attempt to access the same data. Additionally, it is desirable for all of the processors to be able to cache the data they operate on. Thus, each processor may have its own L1 and/or L2 cache, but the system memory may be shared between multiple processors. In such a system, one processor may update a copy of a particular memory location in its cache. If a write-back cache policy is being used, the system memory's copy of the modified data may no longer be consistent with the updated copy in the first processor's cache. If a second processor reads the unmodified data from the system memory, unaware of the first processor's updated copy, memory corruption may result. In order to prevent this, whenever one processor needs to perform a cache fill, it may check to make sure none of the other processors in the system have a more recent copy of the requested data in their caches.

There are several different methods of detecting whether other processors have copies of a particular item of data in their caches. One method is called snooping. Snooping is typically used in systems where all processors that share memory are also coupled to the same bus. Each processor or cache controller monitors the bus for transactions involving data that is currently in its cache. If such a transaction is detected, the particular unit of data may be evicted from the cache or updated in the cache. Another method of detecting whether other caches have copies of requested data involves a data-requesting processor sending probe commands to every other processor and/or cache controller in the system. In response to receiving a probe, a processor or cache controller may generate a response indicating whether its cache contains a copy of the requested data.

In some systems, the time required to maintain cache coherency (e.g., the time required to send probes and receive responses) may be significant. The total time taken to perform a cache fill may depend on the latency of both the cache coherency mechanism and that of the memory system. As a result, the time spent maintaining cache coherency may significantly affect performance. Accordingly, one drawback of sharing memory between devices that have caches is that cache fill performance may decrease.

SUMMARY

Various embodiments of methods and systems for performing a speculative cache fill are disclosed. In one embodiment, a computer system includes several caches that are each coupled to receive data from a shared memory. Each cache is controlled by a respective cache controller. A cache coherency mechanism, which in some embodiments may be part of a chipset, is coupled to the cache controllers and the memory. The cache coherency mechanism is configured to receive a cache fill request. In response to receiving the request, the cache coherency mechanism is configured to send a probe to some of the cache controllers (e.g., all of the cache controllers except for the one controlling the cache that is being filled by the cache fill request). Some time after sending the probe, the cache controller is configured to provide a speculative response to the requesting cache. By delaying to send the speculative response until some time after the probes are sent, the cache coherency mechanism may increase the likelihood that responses to the probes will be received in time to validate the speculative response.

The cache coherency mechanism may be configured to provide speculative response if at least one of the cache controllers to whom a probe was sent has not yet responded to the probe. If one of the cache controllers responds to the probe with an indication that its cache has a modified copy of the data, the cache coherency mechanism may be configured to invalidate the speculative response and provide a non-speculative response after obtaining the most recent copy of the data.

The cache coherency mechanism may be configured to validate the speculative response by providing a validation signal to the first cache's cache controller during the speculative response. If fewer than all of the cache controllers have responded to the probe, the controller may invalidate the speculative response by failing to provide the validation signal.

In another embodiment, a computer system includes a first cache controller configured to control a first cache, a second cache controller configured to control a second cache, and a memory coupled to provide data to the first and second caches. Either or both of the cache controllers may be integrated with a respective processor. A cache coherency mechanism may be coupled to the first cache, the second cache, and the memory. In some embodiments, the cache coherency mechanism may be included in a chipset. In alternative embodiments, portions of the cache coherency mechanism may be included in one or more processors.

The cache coherency mechanism may be configured to receive a first request to provide a copy of data from the memory to the first cache. This request may be generated by a processor in response to a cache miss in the first cache. In response to receiving the first request, the cache coherency mechanism may be configured to send a probe to the second cache controller in order to determine whether the second cache contains a copy of the requested data. If a certain amount of time has elapsed since the probe was sent and the second cache controller has not yet provided a response to the probe to the cache coherency mechanism, the cache coherency mechanism may be configured to provide a speculative response to the first request. In some embodiments, this amount of time may be measured in clock cycles (e.g., by a counter).

The cache coherency mechanism may be configured to prioritize non-speculative responses before speculative responses. For example, if the first amount of time has elapsed and a second, non-speculative response is pending, the cache coherency mechanism may be configured to provide the second response to the first cache before providing the speculative response to the first cache. In some embodiments, the first amount of time may define the time at which the speculative response's "launch window" opens. The cache coherency mechanism may be configured to provide the speculative response at any time during this launch window.

If the cache coherency mechanism receives the response to the probe from the second cache controller, the cache coherency mechanism may be configured to provide an indication that the first response is non-speculative. If the response to the probe indicates that the memory contains the most recent copy of the requested data (and thus the speculative response is no longer speculative), the cache coherency mechanism may also be configured to provide a non-speculative response to the memory (or to validate a speculative response, if there is one). If the response to the probe indicates that the second cache contains a most recent copy of the requested data, the cache coherency mechanism may be configured to invalidate the speculative response, if one was launched, and to provide a non-speculative response to the cache fill request once the most recent copy of the requested data is obtained.

In another embodiment, a method of performing a cache fill in a shared memory computer system may include the steps of a first device asserting a first cache fill request, sending a probe to a second device in response to the first cache fill request being asserted, and, after a first amount of time has elapsed since the probe was sent, providing a speculative response to the first device.

If a response to the probe is not received before a decision point that occurs while the speculative response is being provided (e.g., a point at which the speculative response should be validated), the speculative response may be invalidated. Similarly, if a probe response is received but the response indicates that the system memory's copy of the requested data is not the most recent copy, the speculative response may be invalidated. If the response to the probe is received and indicates that the system memory contains the most recent copy of the requested data, the speculative response may be validated.

BRIEF DESCRIPTION OF THE DRAWINGS

FIG. 3 is a table showing the effects that various probe responses may have on speculative cache fills in one embodiment.

Figure 1:
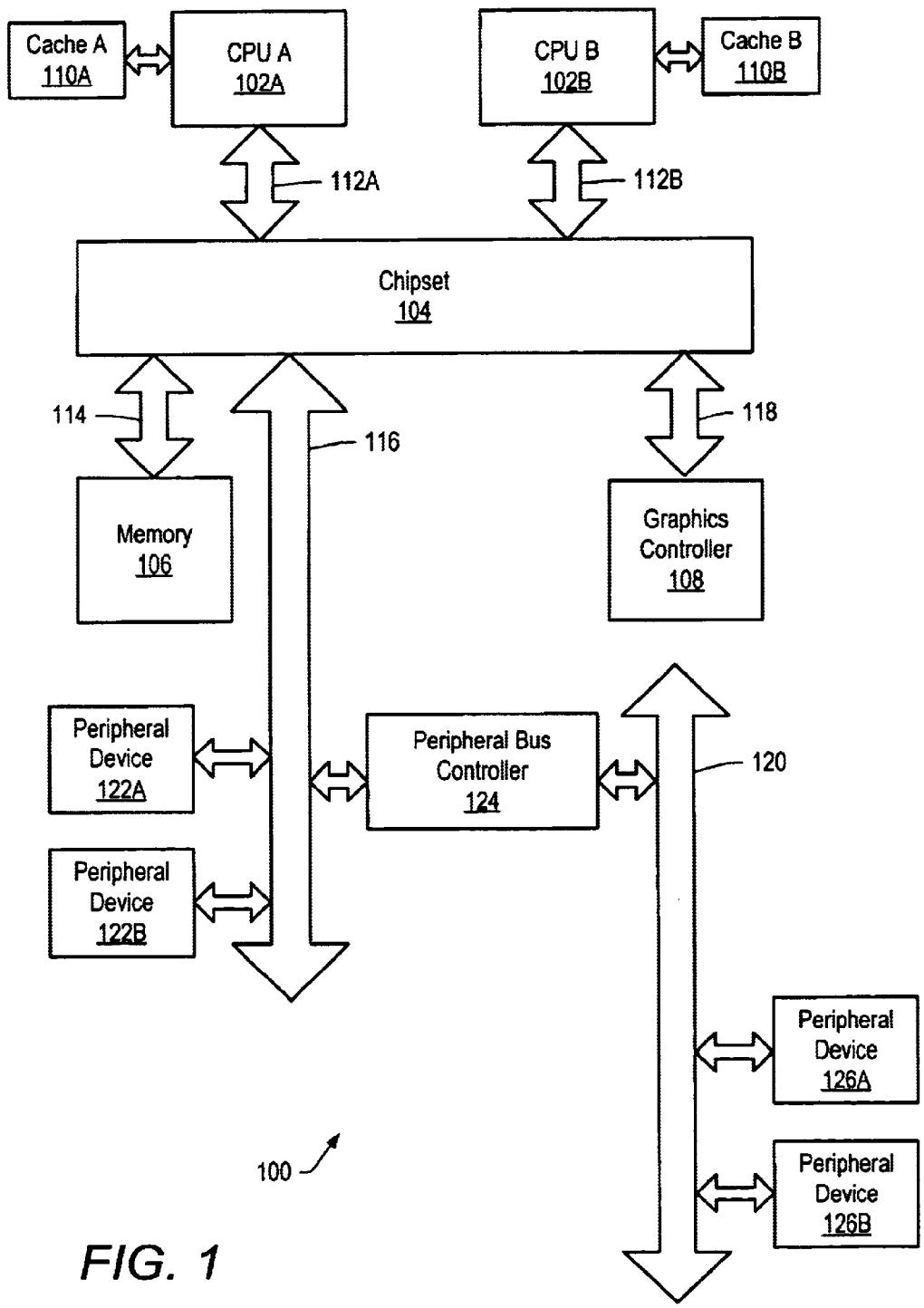
FIG. 1 shows one embodiment of a computer system that may be configured to perform speculative cache fills.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly connected."

DETAILED DESCRIPTION OF EMBODIMENTS
FIG. 1—Computer System

FIG. 1 is a block diagram of one embodiment of a computer system 100 that includes two processors 102A and 102B (collectively referred to as processors 102) coupled to a variety of system components through a chipset 104. Other embodiments of a computer system are possible and contemplated. For example, in some embodiments, additional processors 102 may be included. In the depicted system, a main memory 106 is coupled to chipset 104 through a memory bus 114, and a graphics controller 108 is coupled to chipset 104 through bus 118. Several peripheral devices 122A–122B are coupled to chipset 104 through a peripheral bus 116. In one embodiment, the peripheral bus 116 may be a PCI bus. A peripheral bus controller 124 may also be provided to accommodate an electrical interface to one or more additional peripheral devices 126A–126B through another peripheral bus 120. In one embodiment, peripheral devices 126A–126B may be EISA or ISA devices 218 and peripheral bus 120 may be an EISA/ISA bus.

In this example, processor 102A is coupled to chipset 104 through a CPU bus 112A and to a cache 110A. In some embodiments, processor 102A may include some of the cache controller logic used to control cache 110A. Cache 110A may include an L1 cache that may be integrated with processor 102A. Similarly, cache 110A may include an L2 cache. Such an L2 cache may be separate from processor 102A, integrated into a cartridge (e.g., slot 1 or slot A) with processor 102A, or even integrated onto a semiconductor substrate with processor 102A. In some embodiments, cache 110A may be arranged in a backside configuration, while other embodiments may couple the cache 110A to CPU bus 112A between processor 102A and chipset 104. Alternatively, an external cache may be coupled to chipset 104 and cache control logic for the external cache may be integrated into chipset 104. In some embodiments, cache 110A may have a unified L1 cache, while in others, the L1 cache may be subdivided into separate instruction and data caches. Processor 102B is similarly coupled to chipset 104 by CPU bus 112B and to cache 110B. Cache 10B may be configured similarly to cache 110A.

Each processor 102 may be configured to request data from memory 106 whenever that data is not currently present in that processor's cache. Before the requested data is provided from a shared portion of the memory 106, however, a cache coherency mechanism (e.g., in chipset 104) may need to ascertain whether the other processor 102B has a copy of the requested line in its cache 110B and, if so, whether the other processor 102B has modified its copy of the requested line. Accordingly, chipset 104 may be configured to send a probe to processor 102B that causes processor 102B to search cache 110B for the requested line. As used herein, a "probe" may refer to any communication that causes another device to determine whether it has a copy of the identified data. In some embodiments, a probe may be sent as a packet on an independent communication channel, while in other embodiments, a probe may be communicated as signals asserted on a shared bus. For example, in one embodiment, chipset 104 (or processor 102A) may send a probe packet to processor 102B in response to processor 102A requesting a cache fill from memory 106. In response, processor 102B may generate a response packet that indicates whether a copy of the requested data is present in its cache 110B.

In order to speed up performance, the chipset 104 may be configured to provide a speculative response from memory 106 to processor 102A's cache fill request before the probe response from processor 102B has been received. This way, if processor 102B does not have a copy of the requested data, the requesting processor 102A may more quickly receive its requested data from system memory 106.

Chipset 104 may be configured to invalidate the speculative response to the cache fill request if the other processor 102B fails to respond in time to validate the speculative response or if processor 102B's response indicates that the memory 106 does not have the most recent copy of the requested data. Chipset 104 may be configured to delay providing a speculative response from memory 106 to processor 102A for a certain number of clock cycles after the probe corresponding to the requested data has been sent to the other processor 102B. By delaying the speculative response until some time after the probe has been sent, the likelihood of the other processor 102B returning a probe response in time to validate the speculative response may be increased.

Chipset 104 may provide an interface between processors 102, main memory 106, graphics controller 108, and devices attached to peripheral bus 116. When an operation is received from one of the devices connected to chipset 104, chipset 104 identifies the target of the operation (e.g., a particular device or, in the case of peripheral bus 116, that the target is on bus 116). Chipset 104 routes the operation to the targeted device. Chipset 104 may translate an operation from the protocol used by the source device or bus to the protocol used by the target device or bus.

In addition to providing an interface between peripheral buses 116 and 120, the peripheral bus controller 124 may incorporate additional functionality. An input/output controller (not shown), either external from or integrated with peripheral bus controller 124, may also be included within computer system 100 to provide operational support for a keyboard and mouse (not shown) and for various serial and parallel ports Main memory 106 is a memory in which application programs are stored and from which processors 102 primarily execute. A suitable main memory 106 may comprise DRAM (Dynamic Random Access Memory). For example, a plurality of banks of SDRAM (Synchronous DRAM) or Rambus DRAM (RDRAM) may be suitable.

Peripheral devices 122A–122B are illustrative of a variety of peripheral devices such as network interface cards, video accelerators, audio cards, hard or floppy disk drives or drive controllers, SCSI (Small Computer Systems Interface) adapters and telephony cards. Similarly, peripheral devices 126A and 126B are illustrative of various types of peripheral devices, such as modems, sound cards, and a variety of data acquisition cards such as GPIB or field bus interface cards.

Graphics controller 108 is provided to control the rendering of text and images on a display (not shown). Graphics controller 108 may embody a typical graphics accelerator generally known in the art to render three-dimensional data structures that can be effectively shifted into and from main memory 106. Graphics controller 108 may therefore be a master of bus 118 in that it can request and receive access to a target interface within chipset 104 to thereby obtain access to main memory 106. A dedicated graphics bus accommodates rapid retrieval of data from main memory 106. For certain operations, graphics controller 108 may further be configured to generate PCI protocol transactions on bus 118.

It is noted that, while the AGP, PCI, and ISA or EISA buses have been used as examples in the above description, any bus architectures may be substituted as desired. It is further noted that processor 102B may be connected to chipset 104 via an independent bus (as shown in FIG. 1) or, in alternative embodiment, processor 102B may share CPU bus 112A with processor 102A.

FIG. 2—Chipset

Figure 2:
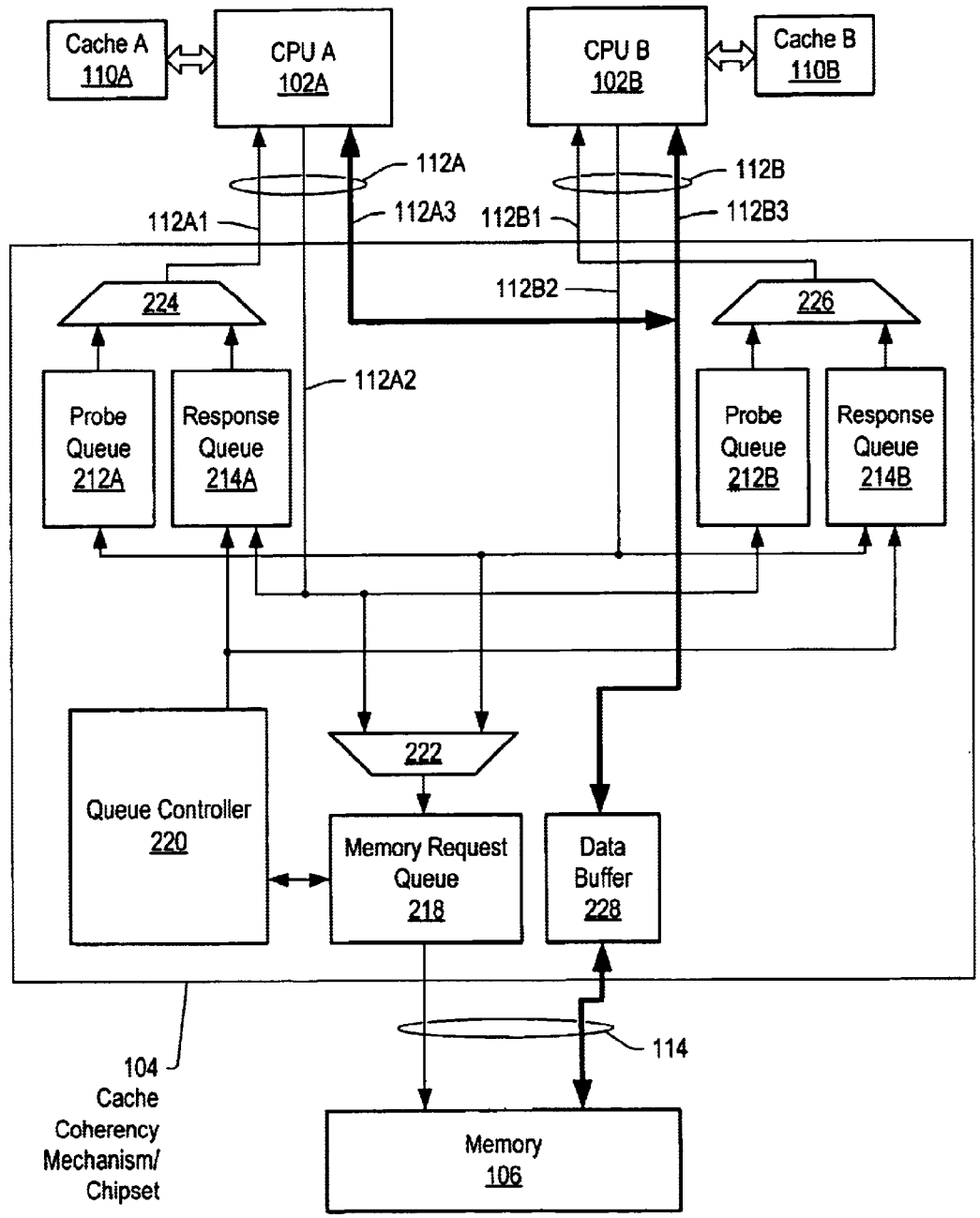
FIG. 2 is a block diagram of one embodiment of a chipset that may be configured to delay providing a speculative response to a cache fill request to the requesting cache until some time after a probe has been sent to a non-requesting processor.

In FIG. 2, one embodiment of chipset 104 and the buses connecting chipset 104 to processors 102 and memory 106 is illustrated. Chipset 104 may include a cache coherency mechanism configured to prevent devices from accessing stale copies of data in memory 106. As described above, in response to a cache miss, one of the processors 102A may assert its cache fill request to memory 106. Chipset 104 may provide memory 106's speculative response to processor 102A's cache fill request to processor 102A before the other processor's probe response has been received. Generally, speculatively performing a cache fill may improve performance in the situation where the other cache 110B does not include a copy (or, depending on the type of request, a modified copy) of the requested data line. Chipset 104 may be configured to delay providing a speculative response to a cache fill request from memory 106 relative to the time at which the corresponding probe is sent to the other processor 102B. If the probe response is not received before a certain time (referred to herein as the "decision point"), the speculative response transaction may be cancelled in order to maintain cache coherency (since the memory's copy of the requested data cannot be guaranteed to be the most recent copy in the system until the probe response has been returned).

If a request is provided to memory 106 at the same time as the probe is sent to the other processor 102B, the probe response may not return until after a decision point. A decision point may be the point at which the response resulting from the request should be either validated or cancelled. If probe responses tend to be received after the decision point, the response transactions initiated in response to the cache fill requests may tend to be cancelled. However, if they had been received before the decision point, the outstanding probe responses might have validated the response transactions. As a result, even though the response transactions may be in the category of transactions whose performance could be improved by performing speculative fills, the response transactions may nonetheless fail to benefit from the speculative fills if the probe responses are received too late. However, by delaying the time at which the speculative response is provided to processor 102A with respect to the time at which the probe is communicated to processor 102B, it may become more likely that the probe response will be returned in time to validate the response transfer. Throughout this disclosure, speculative responses that are validated are referred to as being successful, and speculative responses that are invalidated are referred to as being unsuccessful.

Generally, the later a speculative response from memory 106 is sent to processor 102A (relative to the time at which the probe is sent to processor 102B), the more likely that the probe response will be returned before the decision point. However, delaying too long may reduce the benefit provided by speculatively fetching data from memory, since the performance gained by each successful transaction (relative to the performance obtained by waiting for the response to become non-speculative before providing it to processor 102A) may be reduced to a point at which the performance lost by each unsuccessful transaction exceeds that gained by the successful transactions. Thus, in some embodiments, the point at which speculative responses are launched may be chosen to balance the interests of obtaining performance gains over non-speculative cache fills and of having probe responses returned in time to validate the speculative response.

The amount of delay to insert between the time at which a probe is sent and the time at which a speculative response is provided to the requesting processor may vary among different embodiments. For example, the amount of delay chosen in a particular embodiment may depend on factors such as the amount of time that typically elapses between the decision to launch a speculative response and the time at which the response is actually launched, the time that elapses between the receipt of a probe response and time at which the speculative response is actually validated, propagation delays that arise as various probe, request, and response packets travel through the computer system, and the time that elapses between the receipt of a probe and the generation of a probe response. Many of these values may vary depending on the conditions that arise during the operation of a particular embodiment. For example, propagation delays may vary depending on the amount of congestion in a system at any given time. The time between probe receipt and probe response generation may itself vary depending on the type of probe response that is generated. For example, if the requested data is present in the other processor's cache 110B, it may take longer to generate a probe response packet than if the probe missed in the cache. The processor 102B that receives the probe may take additional time to identify the state of the hit line and/or to invalidate the hit line before generating the probe response. If that processor's cached copy of the requested line is modified, it may take even longer to generate the probe response because the processor 102B may need to initiate data movement in order to update the copy of the data in the memory 106 and/or to provide an updated copy to the requesting processor 102A.

The amount of delay to insert between sending a probe and launching a speculative response may be determined using empirical means. For example, in some embodiments, the amount of delay may be determined by running various benchmarks using different delay settings and comparing the performance of the different delay settings for each of the benchmarks. Based on the performance results obtained for each tested delay setting, a delay setting may be chosen. In some embodiments, the delay setting may be programmable, allowing it to be adjusted in response to changing system conditions. Furthermore, in some embodiments, the delay setting used for a particular speculative response may vary based on which device asserted the request to which the response corresponds.

In the embodiment shown in FIG. 2, the two processor buses 112A and 112B (collectively referred to as processor buses 112) may be split-transaction buses that are each capable of transferring one processor command and one probe response (e.g., on command bus 112A2 or 112B2), one chipset response and one probe (e.g., on command bus 112A1 or 112B1), and one data packet (e.g., on data bus 112A3 or 112B3) simultaneously. The split transaction buses may separate the transfer of a command and its associated data into different transactions on different buses. In some embodiments, data may be returned in a different order than it was requested.

A read transaction may be initiated by one of the processors 102A sending a read command to the memory 106 via the chipset 104. When the chipset 104 is ready to return data to processor 102A, a response may be sent to the requesting processor 102A over its bus 112A1 to alert the processor 102A that data is coming on bus 112A3 and to identify the data request to which the response corresponds. The data may have been sent from memory 106 to data buffer 228 on interconnection 114 prior to the chipset sending the response to processor 102A (or alternatively, the data may be provided directly from memory 106 to processor 102A a programmable number of clocks after the chipset 104 generates the response). From data buffer 228, the data may be provided to the processor 102A over the bus 112A3. Similarly, a write transaction may be requested over the requesting processor's processor bus 112A2. The chipset 104 may responsively send a request to the requesting processor 102A that the associated write data be transferred over the memory bus 112A3 to data buffer 228 (or directly to memory 106) a programmable number of clocks later. Chipset 104 may then cause the data to be transferred from data buffer 228 to memory 106 on bus 114.

When one of the processors 102A asserts a cache fill request (on bus 112A2), a probe corresponding to that request may be added to the other processor's probe queue 212B. The request may also be queued in memory request queue 218. Additionally, a response packet corresponding to the request may be added to processor 102A's response queue 214A. The response packet corresponding to the request may not be provided to processor 102A until a copy of the requested data is available in data buffer 228. A speculative response (e.g., a response from memory 106 to a cache fill request for which the corresponding probe response has not yet been returned) may be identified by an indication associated with the response (e.g., a certain bit in a response packet may be set or cleared to indicate whether the response is speculative). Memory request queue 218 and response queue 214A may be controlled by queue controller 220.

In response to receiving a probe, a processor 102B (or a cache controller) may first determine whether its cache 110B contains a copy of the requested data. In some embodiments, determining whether cache 110B contains the requested data may involve checking an L1 instruction cache, an L1 data cache, and/or an L2 cache for the requested data. If the cache 110B does not include a copy of the requested line, a response to the probe indicating that this cache does not include a copy (i.e., that searching for the requested data resulted in a cache miss) may be sent back to chipset 104 and/or the requesting processor 102A. If the cache 110B does contain the requested data, the processor 102B may send a response indicating that it has the data (i.e., that searching for the requested data caused a cache hit). Additionally, the responding processor 102B may identify the current state (e.g., dirty or clean, MOESI (Modified, Owned, Exclusive, Shared, Invalid), etc.) of the hit line.

Depending on the type of request, a probe may also cause a device to perform other actions. For example, if a processor 102A is requesting a cache line so that it can perform a write, the probe corresponding to the request may invalidate any copies of the requested data that are present in cache 110B. A probe may also cause a device to initiate data movement in order to provide the requesting device and/or memory 106 with the most recently updated copy of the requested data. For example, processor 102B may initiate data movement to provide its copy of the requested data to data buffer 228.

Queue controller 220 may control the time and order in which the requests in the memory request queue 218 are presented to memory 106. Similarly, queue controller 220 may control the time and order in which the responses in the response queue 214A (and/or response queue 214B) are provided to processor 102A (and/or 102B). For example, whenever a speculative response is added to the response queue 214A, the queue controller 220 may delay the time at which that response is launched (i.e., provided to the processor 102A). The time at which a speculative response may be provided to processor 102A (relative to the time at which the probe was sent to processor 102B) may be referred to as that response's launch time. If a copy of the requested data is available in data buffer 228 and the speculative response's launch time has arrived, queue controller 220 may provide that speculative response to processor 102A. If a response is non-speculative and a copy of that response's corresponding data (if any) is available in data buffer 228, the queue controller 220 may provide that response to processor 102A.

If other speculative or non-speculative responses in the response queue 214A are ready to be launched (e.g., because the corresponding data, if any, is available in data buffer 228 and a relevant launch time, if any, has arrived), the queue controller 220 may be configured to provide those responses to processor 102A during the time in which a speculative response is waiting for its launch time. This way, non-speculative responses may "pass" the speculative response in the request queue 218. Furthermore, queue controller 220 may be configured to prioritize non-speculative responses before speculative responses, so any pending non-speculative responses that are ready to be launched may be launched before a speculative response, regardless of the speculative response's launch time.

In some embodiments, the queue controller 220 may track each speculative response's respective launch time using a counter (not shown). This counter may be initialized to a certain value and then incremented or decremented each clock cycle until it reaches another value that indicates that the launch time has been reached. For example, in one embodiment, such a counter may be initialized to the number of clock cycles before the launch time and then count down to zero. When the probe corresponding to the speculative response is launched (or, alternatively, when the speculative response is placed in the response queue 214A), this counter may begin decrementing. The initial value of the counter may correspond to the amount of delay selected to be inserted between the time at which the probe is sent and the time at which the speculative response is sent.

In some embodiments, queue controller 220 may be configured to only provide a speculative response to processor 102A during the clock cycle identified as that speculative response's launch time. In other embodiments, the launch time may instead identify the beginning of a launch "window" during which the speculative response may be launched. In some embodiments, this window may have an infinite length (e.g., the speculative response may be launched any time after its initial launch time). However, in some embodiments, it may also benefit performance to set an upper bound on the time period during which the speculative response can be launched. As mentioned above, if speculative responses are launched too long after the probes are sent, any potential gains that arise from successful transactions may be exceeded by the losses that result from unsuccessful transactions. Accordingly, after a certain point, launching a speculative response may actually tend to degrade performance in some embodiments. Thus, in some embodiments, the launch window may have a limited length.

Like the initial launch time, the length of the launch window may be determined by empirical means. For example, a launch window length may be selected by tabulating the performance gained or lost for speculative responses launched at the initial launch time, responses launched one cycle later, responses launched two cycles later, and so on. Launch window length may also be determined by evaluating the probabilities of speculative responses being launched different numbers of cycles after the initial launch time.

Thus, in some embodiments, the time at which a speculative response may be launched may be defined in terms of a window that opens at the earliest time a speculative response may be launched and closes at the latest time the response may be launched. In some embodiments, if a speculative response fails to launch during its respective launch window (e.g., because other non-speculative responses are being handled during that time), the response may not be launched until it becomes non-speculative (e.g., when the relevant probe responses are returned and/or any data movement needed to obtain the most recent copy of the requested data has completed).

In embodiments where the launch time is defined as a window, two counters may be used to track a response's launch time. For example, one counter may determine when the launch window opens and the other may determine the length of the launch window (e.g., if the window length is four cycles, the length counter may count down for four clock cycles after the launch window opens). Alternatively, the length counter may track the time until the launch window closes, starting at the same time as the counter that tracks the time until the launch window opens. In some embodiments, the two counters may begin counting when the speculative response is stored in the response queue 214A. In other embodiments, the two counters may begin counting when the probe corresponding to the speculative response is launched.

In some embodiments, different launch counters may track launch times and/or launch windows for each entry in the response queue 214A, regardless of whether each entry corresponds to a speculative response. In such an embodiment, the launch timing for non-speculative entries may be disregarded by queue controller 220 when it schedules those entries.

While the queue controller 220 is waiting to launch a speculative response (e.g., waiting for its launch time to arrive or for its launch window to open), the queue controller 220 may also be monitoring the non-requesting processor's bus 112B2 for its response to the probe. In one embodiment, the queue controller 220 may determine whether a probe response corresponds to a particular response in the response queue 218 by comparing a tag contained in the probe response to a tag contained in the response to see if the two tags match. If the non-requesting processor 102B returns a probe response indicating that the requested data is not in its cache 110B before the launch time, the queue controller 220 may change the indication associated with the response to indicate that the response is no longer speculative. Once the response is non-speculative, it may be scheduled without regard to its launch time if its requested data is present in data buffer 228.

In one embodiment, if the non-requesting processor 102B returns a response to a probe indicating that it has a modified copy of the data, the queue controller 220 may indicate that the corresponding response cannot be launched until the modified copy of the data has been provided to data buffer 228 (since otherwise, the response would not return the most recent value of the requested data), even though the response is now non-speculative (because the outstanding probe response has been received). In one embodiment, the queue controller 220 may provide this indication by setting or clearing a particular bit in the response. The indication may be removed (indicating that the response can be launched) when data buffer 228 is updated with the most recent value of the requested data. In one embodiment, the copy of the data in data buffer 228 may also be used to update system memory 106. Note that in some embodiments, the non-requesting processor 102B may also (or alternatively) provide the updated copy of the data directly to the system memory 106.

If no probe response is received before the speculative response's launch time and memory 106 has provided a copy of the requested data to data buffer 228, the speculative response may be provided to processor 102A. After the queue controller 220 sends a speculative response to processor 102A, queue controller 220 may monitor the non-requesting processor's response bus 112B2 for a probe response that validates or cancels the speculative response. In order to validate (or invalidate) a response transaction, the queue controller 220 may assert or deassert certain signals on the requesting processor's bus 112A1 and/or 112A3 during certain cycles of the response transaction to indicate that the transaction is valid (or invalid). If the transaction is validated (e.g., because the probe response indicates that the memory 106 has the most recent copy of the data), the requesting processor 102A may receive the requested data in the response transaction and the queue controller 220 may assert the signals used to validate the transaction. Once the transaction has completed, the queue controller 220 may remove the response from the response queue 214A. In response to signals (or a lack of signals) that indicate that the response transaction is invalid, the requesting processor 102A may be configured to disregard the data being provided from data buffer 228 on data bus 112A3. It is noted that even though the processor 102A may disregard the data, both the processor 102A and the data buffer 228 may still be unable to perform other transactions on the data bus 112A3 during the cycles required to complete the transaction.

If the transaction is invalidated (e.g., because the probe response is not returned in time to validate the transaction or because the probe response indicates that the memory 106 does not have the most recent copy of the requested data), the response may not be launched again until it is non-speculative and any required data movement has completed. Thus, if the probe response was not returned in time to validate the response transaction, the response transaction may be invalidated and the response may remain speculative until the probe response is received. If its speculative launch window has closed by the time the response transaction is cancelled, the response may have to wait until it becomes non-speculative before it can be launched again. If the response transaction was invalidated because the probe response indicated that the transaction was improper (e.g., because the memory 106 did not have the most recent copy of the data), the queue controller 220 may indicate that the response is non-speculative and that it may not be resent until the data movement used to update the data buffer 228 has completed.

FIG. 3 is a table showing an example of the types of cache fill requests and probe responses that may be generated in one embodiment. Additionally, FIG. 3 shows the actions that the queue controller 220 may take in response to receiving the various probe responses. The table shown in FIG. 3 may correspond to an embodiment of a computer system that includes two or more processors. In this embodiment, the probes generated for data and instruction reads may not invalidate copies of the requested data in other processors' caches. In contrast, the probes generated for data writes may invalidate other copies of the requested data.

As the illustrated table shows, in this embodiment, data cache fill requests may request a line in either a shared or an exclusive state (e.g., data reads) or in a modified state (e.g., data writes). Instruction cache fill requests may request lines in a shared state. Regardless of the type of request and the requested state, if a speculative response to the request is launched and the probe responses are not received in time to validate the response transaction (i.e., the probe response is "late"), the speculative response may be invalidated, as shown in the table. Similarly, the table shows that if the probe response is returned in time and indicates that the non-requesting processor does not have a copy of the requested data (i.e., there is a cache miss), the speculative response may be validated, regardless of the type of the transaction.

In the embodiment illustrated in FIG. 3, a request for a data read may, by default, cause the memory to provide the data in an exclusive state. Thus, the table shows that, if the requesting processor requests a data cache line in the shared or exclusive state and the probe response indicates that the line is present but unmodified in the other processor's cache (the response is cache hit—clean), the speculative response may be invalidated and immediately restarted non-speculatively so that the data can be provided in the shared state. Alternatively, during the speculative response, the requesting processor may be notified that the data being provided should be shared instead of exclusive.

During a data read, a data write, or an instruction read, if the probe response indicates that the other processor's cache contains a modified copy of the data (cache hit—dirty), the speculative response may be invalidated, as illustrated in FIG. 3. Additionally, data movement may be initiated to provide the requesting processor with the most recent copy of the data and/or to update the memory. Once the most recent copy of the data is obtained, a non-speculative response transaction may be initiated to provide the requesting processor with the updated copy.

As the table shows, during a data write or an instruction read, a probe response indicating that there was a cache hit on a clean line may cause the speculative response to be validated. In the case of a data write, the probe may also invalidate the copy of the requested data in any of the non-requesting devices' caches.

It is noted that while the above description focuses on systems that include two processors, other embodiments may include additional processors. In such embodiments, probes may be sent to each of the processors' caches, and a response may not become non-speculative until all of the processors have responded to the probes. Additionally, much of the above description assumes that the controller logic for each processor's cache(s) is integrated with that processor and/or that the caches are arranged in a backside configuration with a respective processor (and thus probes may be routed through the processor to reach the cache controller). In embodiments where the cache controller logic is separate from the processor, the probes may be sent to the device that includes the cache controller logic. Also, in some embodiments, portions of the cache coherency mechanism may be included in one or more of the processors.

Additionally, in an alternative embodiment, the queue controller 220 may effectively delay when the speculative response is provided to the requesting processor 102A by delaying the time at which the request is provided to memory 106 from memory request queue 218 instead of or in addition to delaying the time at which the speculative response is provided from the response queue 214A.

Figure 4A:
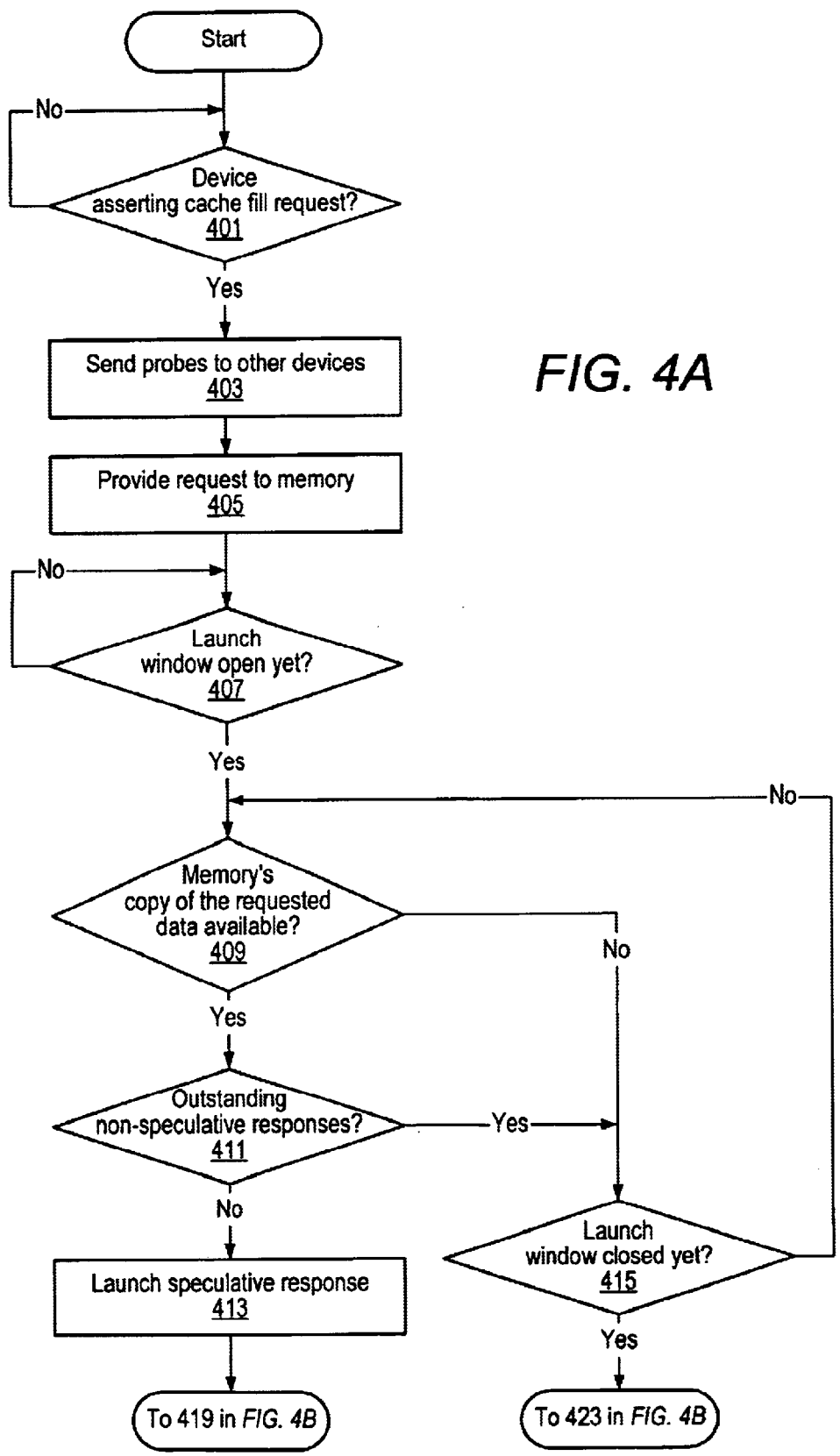
FIGS. 4A–4B show one embodiment of a method of performing a speculative cache fill that involves delaying the time at which a speculative response to a cache fill request is provided to the requesting device relative to the time at which probe(s) are sent to non-requesting device(s).
Figure 4B:
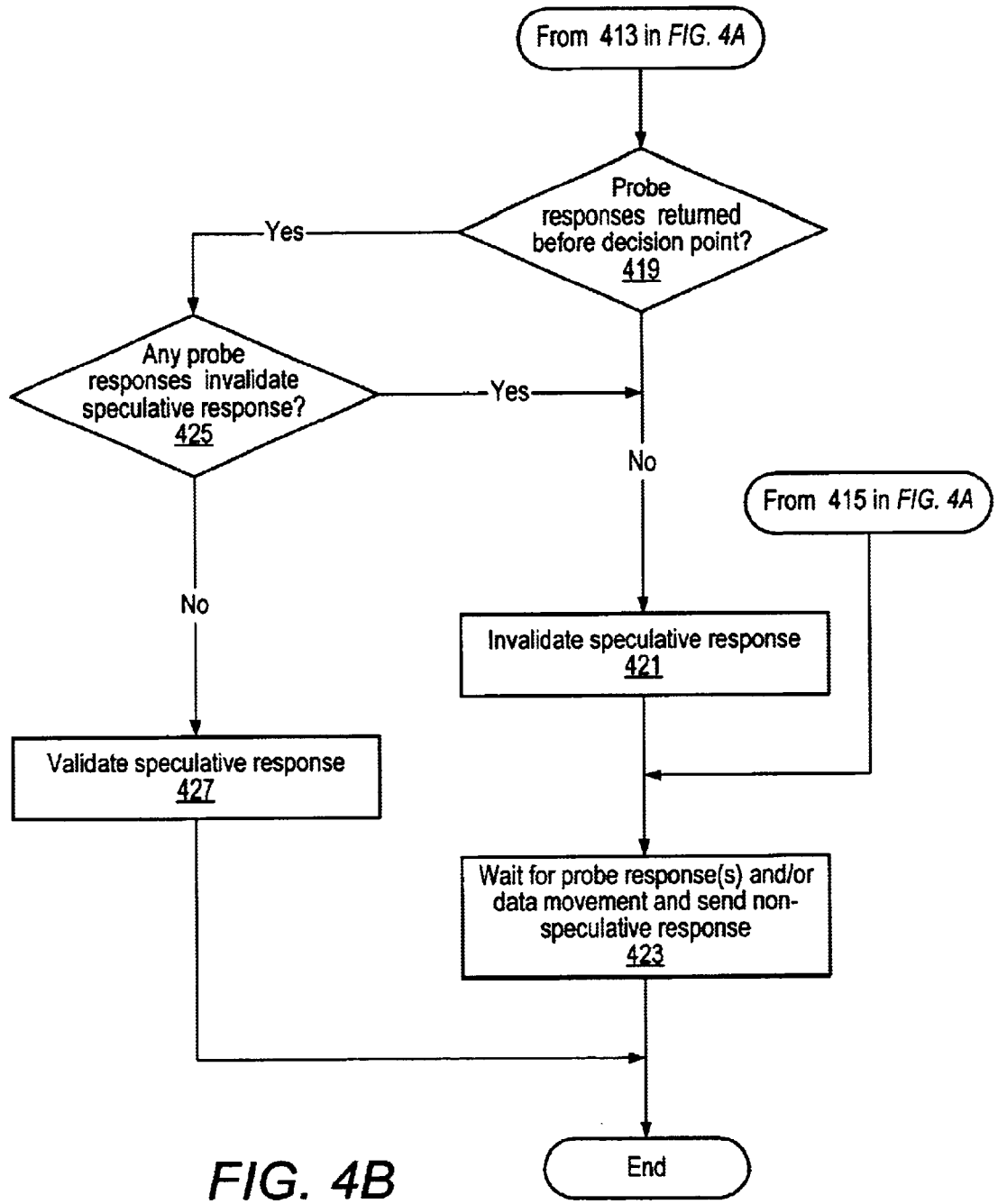

In FIGS. 4A and 4B, one embodiment of a method of maintaining cache coherency and performing speculative cache fills is shown. At 401, if a device asserts a cache fill request, probes may be sent to other devices in the system to determine whether any of the other devices currently have a copy of the data, as shown in 403. Sending probes may involve sending probe packets or broadcasting the requesting device's request to each of the other devices that may currently have a copy of the requested data.

The cache fill request may be provided to memory, as shown at 405. In some embodiments, the cache fill request may be provided at substantially the same time as the probe responses are sent, while in other embodiments, the time at which the cache fill request is provided to memory may be delayed with respect to the time at which the probe responses are sent.

Once a launch window opens and the memory's copy of the requested data is available, a speculative response to the cache fill request may be launched, as shown at 409, 411, and 413. Depending on the embodiment, the width of the launch window may range from one clock cycle to an unlimited number of clock cycles. The response is speculative in the sense that it is launched before all of the probe responses have returned, and thus the copy of the data being speculatively provided from the memory may not be the most recently updated copy of the data. The time at which the launch window opens may be a value that is selected to improve average memory request latency in the system. For example, the memory request latency may depend on factors such as time it takes to launch a response after the response is selected to be launched, the time it takes to validate the speculative response after the probe responses are received, the time it takes for other devices to send a response to a probe, the time it takes to propagate probes and responses through the system, and/or system congestion. Based on factors such as these, a launch window opening may be selected so that, on average, probe responses return just in time to validate a corresponding speculative response.

In some embodiments, other factors may also be considered in determining whether to launch a speculative response. For example, if other, non-speculative responses are pending at the same time, as shown at 411, it may benefit performance to provide these responses to the requesting device before (or instead of) the speculative response.

As mentioned earlier, launching a speculative response more than a certain number of cycles after the launch window opens may adversely affect performance in some embodiments. Thus, some embodiments may set a limit on how long the launch window remains open. In such a case, a speculative response may not be launched if the launch window for that response has already closed, as shown at 415. Instead, the response may wait until the relevant probe responses have been received before being launched non-speculatively, as shown at 423.

After the speculative response is launched, there may be a certain amount of time before a decision point (e.g., a point at which the speculative response should either be validated or cancelled) is reached. For example, in one embodiment, a validation signal may be asserted during one or more of the clock cycles of a response transaction in order to validate that response. Absent the validation signal, the receiving device may ignore the data being provided with the response. The earliest point at which the validation signal should be asserted in order to validate the response may be the decision point for that response.

If the speculative response is launched during the launch window and one or more of the relevant probe responses are not received before the decision point, as shown at 419, the speculative response may be cancelled, as indicated at 421. For example, in one embodiment, the response may be cancelled if a validation signal is not asserted at a certain time during the response transaction. Similarly, if any probe responses are received that invalidate the response (e.g., by indicating that another device has a more recent copy of the requested data) before the decision point, as indicated at 421, the speculative response may be cancelled or invalidated, as shown at 421. On the other hand, if the probe responses are returned before the decision point and indicate that the memory transfer may be validated (e.g., because the memory has the most recent copy of the data), the memory transfer may be allowed to complete, as indicated at 427.

If a speculative response is cancelled or invalidated (at 421), the response may not be provided to the memory again until any remaining outstanding probe responses are received and/or until any data movement needed to update the memory's copy of the data completes, as indicated at 421. At this point, a non-speculative response may be provided to requesting device.

Figure 5:
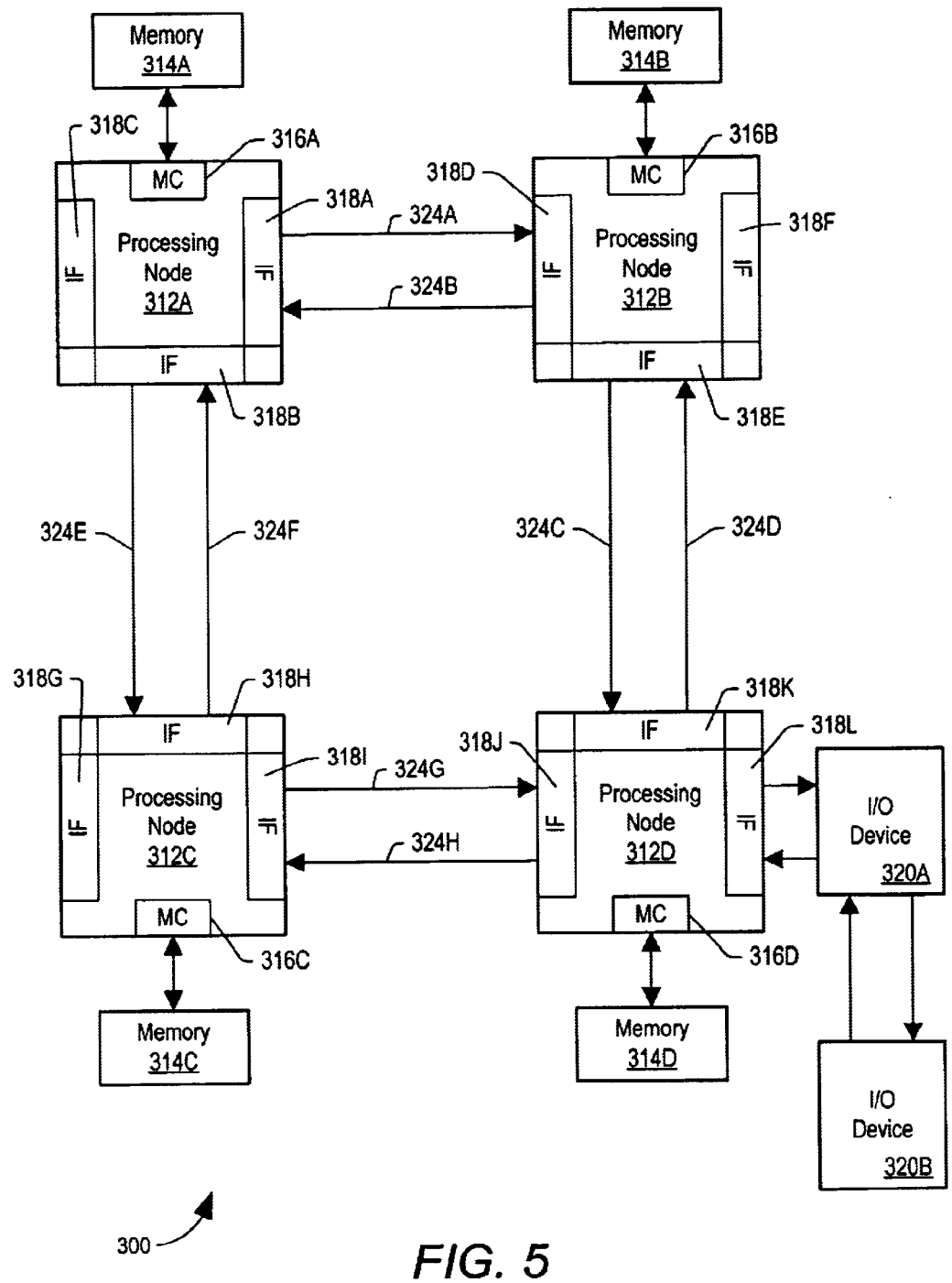
FIG. 5 illustrates one embodiment of a multi-node computer system.

FIG. 5—Multi-node Processing System

FIG. 5 shows another embodiment of a computer system 300 that may delay launching speculative cache fill responses relative to the time at which their corresponding probes are launched. Other embodiments are possible and contemplated. In the embodiment of FIG. 5, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g., devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g., lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 5. Generally, each set of lines 324 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 5. Any suitable routing algorithm may be used. Other embodiments of computer system 300 may include more or fewer processing nodes then the embodiment shown in FIG. 5.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. For example, each processing node 312A–312D may comprise one or more copies of processor 102A and/or 102B. External interface unit 318 may include the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. Memory controllers 316A–316D may comprise control circuitry for interfacing to memories 314A–314D. Additionally, memory controllers 316A–316D may include request queues for queuing memory requests.

In one embodiment, the coherency point for an address within computer system 300 is the memory controller 316A–316D coupled to the memory storing bytes corresponding to the address. In other words, the memory controller 316A–316D may be responsible for ensuring that each memory access to the corresponding memory 314A–314D occurs in a cache coherent fashion by sending probes to non-requesting devices. Each memory controller 316A–316D may be configured to delay sending speculative responses to cache fill requests to a requesting device until a certain amount of time after probes have been sent to the non-requesting devices. If any of the probe responses have not been received in time to validate the speculative response to the cache fill request (or if any probe responses invalidate the speculative response), the memory controller that provided the speculative response may be configured to invalidate the speculative response.

In some embodiments, a memory controller 316A–316D in a node that maps a cache fill request may be configured to send data to the node that initiated the cache fill request as soon as the memory access has completed (in some situations, the initiating node may be the same node as the memory controller's node). In such an embodiment, probe responses that relate to the memory access may be directed to the initiating node. An interface 318 in the initiating node may be configured to speculatively provide the data to the processor that initiated the cache fill request before the probe responses have all been received. In one embodiment, the interface may delay its speculative response relative to when it receives the data, which in turn delays the response relative to when probes were sent to non-requesting devices. If any probe responses are not received in time to validate the interface's speculative response, or if any probe responses invalidate the speculative response, the interface may cancel its speculative response. Note that in other embodiments, the memory controller may delay its speculative response relative to when the probes were launched and the interface in the initiating node may speculatively provide the data to the requesting processor as soon as it is received.

In one embodiment, if probe responses are received by the initiating node before the node that maps the cache fill request has responded with data, the initiating node may cancel the memory controller's speculative response to the initiating node. Note that in other embodiments, probe responses may be received by the node that maps the cache fill request instead of the node that initiated the cache fill request.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include devices for communicate with another computer system to which the devices may be coupled (e.g., network interface cards or modems). Furthermore, I/O devices 320A–320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

As used herein, the term "clock cycle" refers to an interval of time in which the various stages of the instruction processing pipelines complete their tasks. Instructions and computed values are captured by memory elements (such as registers or arrays) according to a clock signal defining the clock cycle. For example, a memory element may capture a value according to the rising or falling edge of the clock signal.

Numerous variations and modifications will become apparent to those skilled in the art once the above disclosure is fully appreciated. It is intended that the following claims be interpreted to embrace all such variations and modifications.

What is claimed is:

1. A computer system comprising:
   a plurality of caches;
   a plurality of cache controllers, wherein each cache controller is coupled to control a respective one of the caches;
   a memory coupled to provide data to each of the caches; and
   a cache coherency mechanism coupled to the cache controllers and the memory, wherein the cache coherency mechanism is configured to receive a request to provide a copy of data from the memory to a first cache;
   wherein in response to receiving the request, the cache coherency mechanism is configured to send a probe to a first set of the cache controllers, wherein each of the first set of cache controllers is configured to determine whether its cache contains the data in response to receiving the probe;
   wherein if a first number of clock cycles have elapsed after the probe was sent, the cache coherency mechanism is configured to provide a speculative response to the request before all of the first set of cache controllers have responded to the probe.

2. The computer system of claim 1, wherein each cache controller in a first portion of the cache controllers is integrated with a respective processor.

3. The computer system of claim 1, wherein the cache coherency mechanism is configured to provide the speculative response if at least one of the first set of cache controllers has not yet responded to the probe.

4. The computer system of claim 1, wherein if one of the first set of cache controllers responds to the probe with an indication that one of the caches has a modified copy of the data, the cache coherency mechanism is configured to invalidate the speculative response.

5. The computer system of claim 1, wherein the cache coherency mechanism is configured to validate the speculative response by providing a validation signal to the first cache's cache controller as the memory's copy of the requested data is being provided to the first cache.

6. The computer system of claim 5, wherein if fewer than all of the first set of cache controllers have responded to the probe, the cache coherency mechanism is configured to not provide the validation signal.

7. A computer system comprising:
   a first cache controller configured to control a first cache;
   a second cache controller configured to control a second cache;
   a memory coupled to provide data to the first cache and the second cache; and
   a cache coherency mechanism coupled to the first cache, the second cache, and the memory and configured to receive a first request to provide a copy of data to the first cache;
   wherein in response to receiving the first request, the cache coherency mechanism is configured to send a probe to the second cache controller;
   wherein in response to receiving the probe, the second cache controller is configured to determine whether the second cache contains the data;
   wherein if a first amount of time has elapsed since the probe was sent and the second cache controller has not yet provided a response to the probe to the cache coherency mechanism, the cache coherency mechanism is configured to provide a speculative response to the first request to the first cache.

8. The computer system of claim 7, wherein the first amount of time is measured in clock cycles.

9. The computer system of claim 7, wherein each of the first and second cache controllers is integrated with a respective processor.

10. The computer system of claim 7, wherein the cache coherency mechanism is comprised in a chipset configured to couple the first and second cache to the memory.

11. The computer system of claim 7, wherein the cache coherency mechanism is configured to receive the first request from a first processor, wherein the first processor is configured to generate the first request in response to a cache miss in the first cache.

12. The computer system of claim 7, wherein if the first amount of time has elapsed and a non-speculative response is pending, the cache coherency mechanism is configured to provide the non-speculative response to the first cache before providing the speculative response to the first cache.

13. The computer system of claim 7, wherein the cache coherency mechanism is configured to provide the speculative response to the first cache if the first amount of time has elapsed and a second amount of time has not elapsed since the probe was sent, wherein the second amount of time is greater than the first amount of time.

14. The computer system of claim 7, wherein the first amount of time is tracked by a counter comprised in the cache coherency mechanism.

15. The computer system of claim 14, wherein the counter is configured to begin counting when the probe is sent.

16. The computer system of claim 14, wherein the counter is configured to begin counting when an entry corresponding to the speculative response is allocated in a response queue comprised in the cache coherency mechanism.

17. The computer system of claim 7, wherein if the response to the probe indicates that the memory contains a most recent copy of the data requested in the first request, the cache coherency mechanism is configured to validate the speculative response.

18. The computer system of claim 7, wherein if the cache coherency mechanism receives the response to the probe from the second cache controller, the cache controller is configured to generate an indication that the speculative response has become a non-speculative response.

19. The computer system of claim 7, wherein if the response to the probe indicates that the second cache contains a most recent copy of the data requested in the first request, the cache coherency mechanism is configured to invalidate the speculative response.

20. The computer system of claim 19, wherein if the response to the probe indicates that the second cache contains a most recent copy of the data requested in the first request, the cache coherency mechanism is configured to provide a non-speculative response to the first cache in response to obtaining the most recent copy of the data from the second cache.

21. The computer system of claim 7, wherein the cache coherency mechanism is configured to invalidate the speculative response if the response to the probe is not received.

22. The computer system of claim 21, wherein if the cache coherency mechanism invalidates the speculative response, the cache coherency mechanism is configured to provide a non-speculative response to the first request in response to receiving the response to the probe from the second cache controller.

23. The computer system of claim 7, wherein the second cache comprises both a level one (L1) cache and a level two (L2) cache.

24. A method of performing a cache fill in a shared memory computer system, the method comprising:

a first device asserting a first cache fill request requesting that data from system memory be stored in the first device's cache;

in response to said asserting, sending a probe to a second device;

in response to receiving the probe, the second device determining whether the second device's cache contains the data; and in response to a first amount of time elapsing after said sending and not receiving a response to the probe from the second device before said elapsing, providing a speculative response to the first cache fill request to the first device.

25. The method of claim 24, further comprising providing a non-speculative response to the first cache fill request to the first device in response to receiving a response to the probe from the second device if said receiving occurs after said elapsing.

26. The method of claim 24, wherein said requesting comprises the first device requesting the data from system memory in response to a cache miss occurring in the first device's cache.

27. The method of claim 24, further comprising invalidating the speculative response in response to not receiving a response to the probe from the second device before a decision point, wherein the decision point occurs during said providing a speculative response.

28. The method of claim 24, further comprising:

invalidating the speculative response in response to receiving a response to the probe from the second device before a decision point, wherein the response indicates that the system memory does not contain a most recent copy of the data;

in response to said invalidating, providing a non-speculative response to the first cache fill request to the first device, wherein the non-speculative response comprises the most recent copy of the data.

29. The method of claim 24, further comprising validating the speculative response in response to receiving a response to the probe from the second device, wherein the response to the probe indicates that the system memory contains a most recent copy of the data.

30. The method of claim 24, further comprising opening a launch window in response to said elapsing, wherein said providing a speculative response occurs during the launch window.

31. The method of claim 30, further comprising closing the launch window in response to a second amount of time elapsing after said sending.

32. The method of claim 24, wherein the first amount of time is measured in clock cycles.

33. The method of claim 32, further comprising decrementing a counter each clock cycle in response to said sending, wherein said elapsing occurs when the counter is decremented to a minimum counter value.

34. The method of claim 24, further comprising providing a non-speculative response to the first device before providing the speculative response to the first device.

35. The method of claim 24, wherein the second device is configured to control a second cache, wherein the second cache comprises a level one (L1) cache and a level two (L2) cache.

* * * * *